(12) United States Patent
Neergaard

(10) Patent No.: US 9,158,871 B2
(45) Date of Patent: Oct. 13, 2015

(54) GRAPH MODELING SYSTEMS AND METHODS

(71) Applicant: UT-Battelle, LLC, Oak Ridge, TN (US)

(72) Inventor: Mike Neergaard, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 251 days.

(21) Appl. No.: 13/857,180

(22) Filed: Apr. 5, 2013

(65) Prior Publication Data

US 2013/0268253 A1  Oct. 10, 2013

Related U.S. Application Data

(60) Provisional application No. 61/621,120, filed on Apr. 6, 2012.

(51) Int. Cl.
*G06F 17/50* (2006.01)

(52) U.S. Cl.
CPC ................ *G06F 17/5009* (2013.01)

(58) Field of Classification Search
USPC ............... 703/2; 700/22; 340/870, 870.01; 709/201
See application file for complete search history.

(56) References Cited

U.S. PATENT DOCUMENTS

| | | | |
|---|---|---|---|
| 5,742,795 A | 4/1998 | Küssel | |
| 7,499,762 B2* | 3/2009 | Khorramshahi | 700/22 |
| 7,584,086 B2 | 9/2009 | Frankel | |
| 7,661,080 B2* | 2/2010 | Papadopoulou | G06F 17/5081 716/103 |
| 7,680,548 B2* | 3/2010 | Khorramshahi | 700/22 |
| 7,693,072 B2* | 4/2010 | Chiang | H04L 41/12 370/238 |
| 8,174,992 B2* | 5/2012 | Farkas | H04L 45/48 370/216 |
| 2006/0056288 A1 | 3/2006 | Powers et al. | |
| 2007/0076628 A1 | 4/2007 | Li et al. | |
| 2007/0226290 A1* | 9/2007 | Khorramshahi | 709/201 |
| 2008/0178137 A1* | 7/2008 | Papadopoulou | G06F 17/5081 716/52 |
| 2009/0125852 A1* | 5/2009 | Papadopoulou | G06F 17/5081 716/136 |
| 2009/0138100 A1* | 5/2009 | Khorramshahi | 700/22 |
| 2009/0157371 A1 | 6/2009 | Conway | |
| 2009/0228253 A1 | 9/2009 | Tolone et al. | |

FOREIGN PATENT DOCUMENTS

WO  WO 2011/015616  9/2011

OTHER PUBLICATIONS

Albert, Reka, et al, "Structural vulnerability of the North American power grid," published in Physical Review E on Feb. 26, 2004, and downloaded at http://pre.aps.org/abstract/PRE/v69/i2/e025103.

* cited by examiner

*Primary Examiner* — Thai Phan
(74) *Attorney, Agent, or Firm* — Warner Norcross & Judd LLP

(57) ABSTRACT

An apparatus and a method for vulnerability and reliability modeling are provided. The method generally includes constructing a graph model of a physical network using a computer, the graph model including a plurality of terminating vertices to represent nodes in the physical network, a plurality of edges to represent transmission paths in the physical network, and a non-terminating vertex to represent a non-nodal vulnerability along a transmission path in the physical network. The method additionally includes evaluating the vulnerability and reliability of the physical network using the constructed graph model, wherein the vulnerability and reliability evaluation includes a determination of whether each terminating and non-terminating vertex represents a critical point of failure. The method can be utilized to evaluate wide variety of networks, including power grid infrastructures, communication network topologies, and fluid distribution systems.

20 Claims, 3 Drawing Sheets

GRAPH MODELING SYSTEMS AND METHODS

CROSS-REFERENCE TO RELATED APPLICATIONS

This application claims the benefit of U.S. Provisional Application No. 61/621,120, filed Apr. 6, 2012, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to reliability and vulnerability modeling, and in particular to reliability and vulnerability modeling of networked transmission systems.

A variety of physical networks can be modeled in terms of their components and the interrelationships between these components. For example, power grid infrastructures, communication network topologies, and water distribution systems can each be modeled with a graphical topology of nodes and edges. In these graph models, each node represents certain network components. For example, the nodes might represent an electrical generator, a local area network, or a pumping station. Edges extending between the nodes might represent the transmission of power, data, services, or resources moving between two or more nodes in the graphical topology.

Graph models of this nature are increasingly utilized in vulnerability and reliability studies. Vulnerability and reliability studies can reveal potential network vulnerabilities to natural disasters, human error, and adversarial behavior. In addition, these studies can provide a probability of network failure, as well as potential network modifications for reducing a probability of network failure.

Despite these advantages, existing graph models suffer from a number of drawbacks. For example, existing graph models can fail to identify network components that might impact overall network performance in a meaningful way. As a result, vulnerability and reliability studies that rely on existing graph models present an incomplete risk picture. Accordingly, there remains a need for an improved network and method for graph modeling. In particular, there remains a need for an improved system and method for accurate modeling of networked transmission systems.

SUMMARY OF THE INVENTION

A system and method for modeling a physical network are provided. The system and method generally include constructing a graph model of a physical network using a computer, the graph model including a non-terminating vertex to represent a non-nodal vulnerability in the physical network. The non-terminating vertex can be utilized to represent common vulnerabilities among multiple transmission paths within the physical network, and to determine overall network reliability and vulnerability.

In one aspect of the invention, a method includes constructing a graph model including a plurality of terminating vertices to represent nodes in the physical network, a plurality of edges to represent transmission paths in the physical network, and non-terminating vertex to represent an intermediate element along a transmission path between two of the network nodes. The intermediate element is optionally a device utilized by at least two transmission paths in the physical network, where degradation of the device alters a characteristic of the transmission paths traversing the device.

In another embodiment, the constructed model includes a weighted graph, where the edges extending through the non-terminating vertex include a first weight on one side thereof and a second weight on another side thereof. The constructed model can additionally include a multi-layered model include a plurality of sub-graphs. A first sub-graph can depict the intermediate element as a non-terminating vertex and the second sub-graph can depict the intermediate element as a terminating vertex. The method can additionally include determining whether each terminating and non-terminating vertex represents a critical point of failure in the physical network.

In another aspect of the invention, a system for modeling a physical network includes a processor and a memory contained within a housing. The memory includes pre-programmed instructions executable by the processor for generating a graph model, where the graph model includes a non-terminating vertex representing a non-nodal vulnerability of the physical network. The graph model additionally includes a plurality of terminating vertices to represent nodes in the physical network and a plurality of edges to represent transmission paths in the physical network In one embodiment, the memory additionally includes pre-programmed instructions for performing a vulnerability analysis utilizing the graph model. The vulnerability analysis can include determining whether the physical network should be modified to include one or more additional nodes or transmission paths. In addition, the non-nodal vulnerability can represent an intermediate device between network nodes, the degradation of which would alter the performance of the physical network. The intermediate device is optionally utilized by multiple transmission paths in the physical network, where degradation of the intermediate device alters a characteristic of each of the multiple transmission paths.

The system and method can be utilized to evaluate a variety of physical networks, including power grid infrastructures, communication network topologies, and fluid distribution systems, for example. The system and method additionally provide an improved model that allows transmission paths to be grouped together according to a common non-nodal vulnerability. In addition, the improved model can better accommodate real-life features of networks, while also representing them in a computationally amenable format.

These and other features and advantages of the present invention will become apparent from the following description of the invention, when viewed in accordance with the accompanying drawings and appended claims.

DETAILED DESCRIPTION OF THE CURRENT EMBODIMENT

The invention as contemplated and disclosed herein includes a system and a method for modeling a physical network. As set forth below, the system and method include constructing a computational graph model utilizing a non-terminating vertex to represent an intermediate element, optionally a single failure point, along one or more transmission paths of the physical network.

Figure 1:
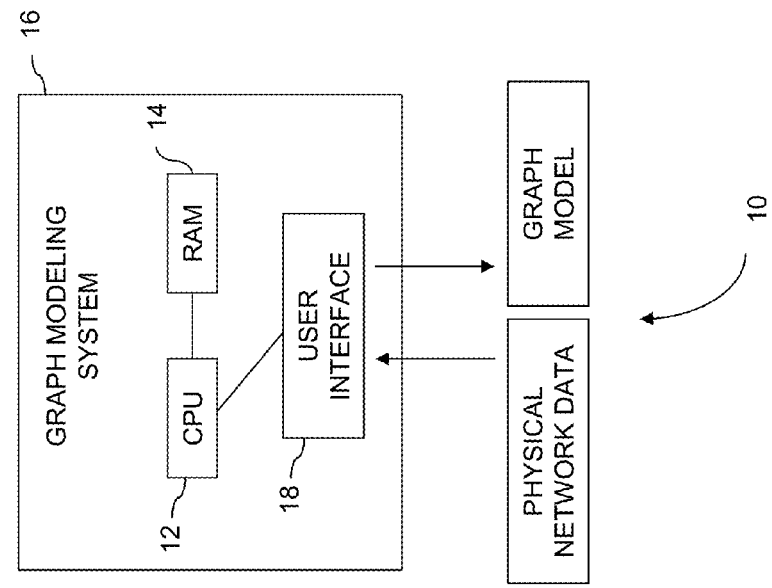
FIG. 1 is a block diagram illustrating a graph modeling system in accordance with an embodiment of the invention.

Referring now to FIG. 1, a graph modeling system in accordance with an embodiment of the present invention is illustrated and generally designated 10. The system 10 generally includes an internal processor 12 and an internal memory 14 contained within a housing 16. As explained below, the internal processor 12 is adapted to generate a computational graph in accordance with machine readable instructions in memory 14. The system 10 is operable to accept data relating to the physical system through a user interface 18. A resulting computational graph is made accessible through the user interface 18, optionally in conjunction with a reliability or vulnerability analysis.

The graph modeling system 10 can be a standalone device or an embedded device that is incorporated into a machine or a system. For example, the graph modeling system 10 can include all or a part of a mainframe, a super computer, a personal computer, a tablet computer or other computing device whether now known or hereinafter developed. The device memory 14 is generally programmed with a series of instructions that, when executed, cause the processor 12 to perform certain method steps. While the memory 14 is depicted as being physically located within an outer housing 16, the memory 14 and consequently the machine readable instructions can instead be distributed across many different devices.

Figure 4:
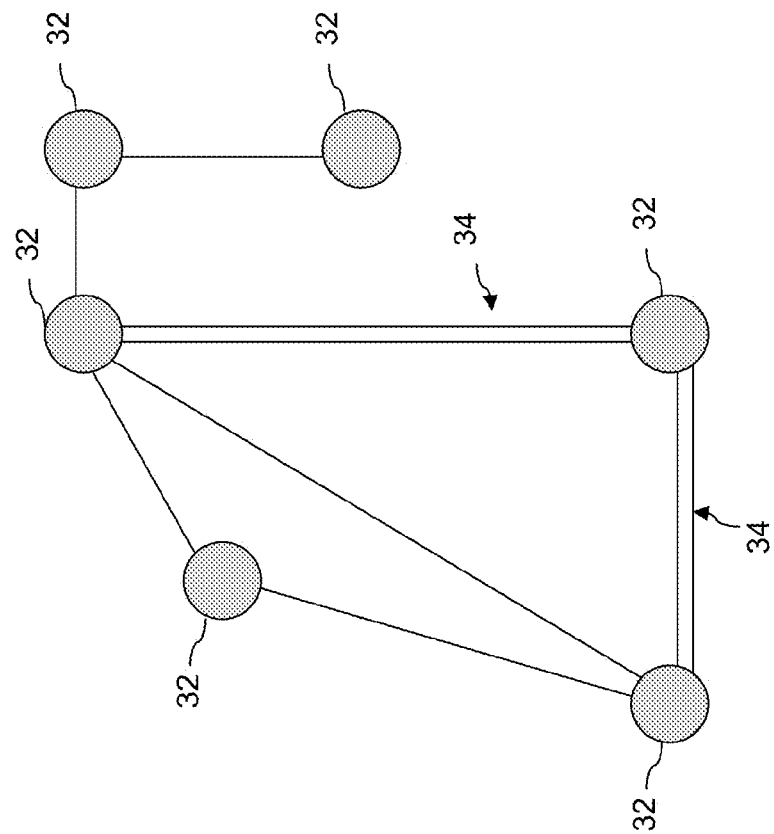
FIG. 4 is a first graph model of the transmission grid of FIG. 3.

Operation of the system of FIG. 1 will now be described with reference to the flow chart of FIG. 2 and the graphs of FIGS. 3-6. At step 20, the graph modeling system 10 accepts information pertaining to a physical network. At step 22, the graph modeling system 10 converts the accepted data into a directed, weighted graph represented as a set of vertices $\{v\}$ and a set of edges. The edges are represented as a set of ordered coordinates $(v_1, v_2, \omega)$, where $v_1$ is the originating vertex, $v_2$ is the destination vertex, and $\omega$ is the weight. In addition, $v_1$ and $v_2$ are members of the set $\{v\}$, or $v_1, v_2 \in \{v\}$. In addition, the edges can additionally be non-directional or bi-directional, and can be non-weighted if desired. Each vertex generally represents a node in the physical network, and each edge generally represents a transmission path in the physical network. In particular, each node can include a network end-point or a redistribution point. That is, each node can be an active element capable of sending, receiving, or forwarding as part of the overall physical network. For example, a power grid infrastructure is generally shown in FIG. 3, and a partially completed graph model is illustrated in FIG. 4. Each node 33 in FIG. 3 depicts a sub-station in the physical network, and each transmission path 34 in FIG. 3 depicts one or more power lines between two sub-stations. In like manner, the vertices 32 in FIG. 4 depict the sub-stations, while the edges 34 depict transmission paths.

Figure 5:
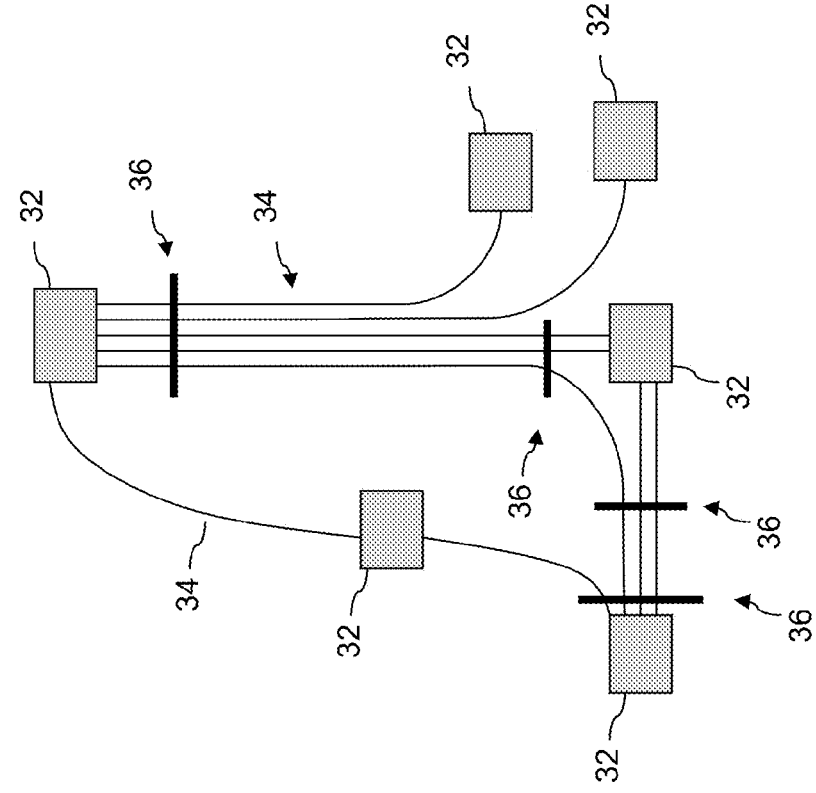
FIG. 5 is the transmission grid of FIG. 3 including transmission paths grouped according to a common vulnerability.

Referring again to FIG. 2, the system 10 identifies non-terminating vertices at step 24. Non-terminating vertices can represent a non-nodal element in the physical network. For example, the non-nodal element can include an intermediate element, or a pass-through device or structure utilized by one or more transmission paths in the physical network. In some embodiments the non-nodal element is a single point of failure for multiple transmission paths. In other embodiments the non-nodal element is a descriptive point. That is, degradation of the pass-through device or structure alters a transmission characteristic of the physical network. For example, the non-nodal element can include a circuit breaker between two nodes in a power distribution network. Also by example, the non-nodal element can include a circuit breaker panel between first plurality of nodes and a second plurality of nodes, such that a plurality of transmission paths extend through the circuit breaker. In this regard, each of the plurality of transmission paths include a common vulnerability—the circuit breaker panel—however the circuit breaker panel does not send, consume, or forward electrical power and might not otherwise be represented in a computational graph and leaving a vulnerability unaccounted for. As shown in FIG. 5 for example, multiple transmission paths 34 share a common non-nodal vulnerability (e.g. common transmission paths), denoted with a transverse bar 36. Note that this vulnerability is not depicted in the partial graph of FIG. 4, however. At step 26, and to account for non-nodal vulnerabilities, the graph of FIG. 4 is modified in FIG. 6 to incorporate non-terminating vertices 38. Edges are now represented as $(v_1, v_2, \ldots v_n, \omega_1, \omega_2, \ldots \omega_{n-1})$, where $v_1$ is the originating vertex, $v_n$ is the destination vertex, and $v_2$ through $v_{n-1}$ are non-terminating vertices. The weight $\omega_2$ is associated to the sub-edge between vertices $v_j$ and $v_{j+1}$. In a graphical user interface, a non-terminating vertex 38 may be visually distinguishable from a terminating vertex 32. For example, the terminating vertex 32 is represented by a solid dot, i.e., any edge that terminates at the boundary of the dot utilized the vertex as its termination point. In addition, the non-terminating vertex 38 is represented as a translucent dot in FIG. 6, while other differentiating shapes or shadings can be utilized as desired.

At step 28, the system 10 completes the computational graph model of the physical network. If desired, the system 10 can perform a reliability or vulnerability analysis on the graph model at step 30. By extending a directed, weighted graph to incorporate non-terminating vertices along an edge, the processor 12 can perform the reliability or vulnerability analysis to determine if the physical system is or will operate within acceptable limits. A reliability or vulnerability analysis can include a determination of whether each terminating 32 and non-terminating vertex 38 represents a critical point of failure. In addition, a reliability or vulnerability analysis can include a determination of whether the system should be modified to include one or more additional nodes or transmission paths.

Figure 6:
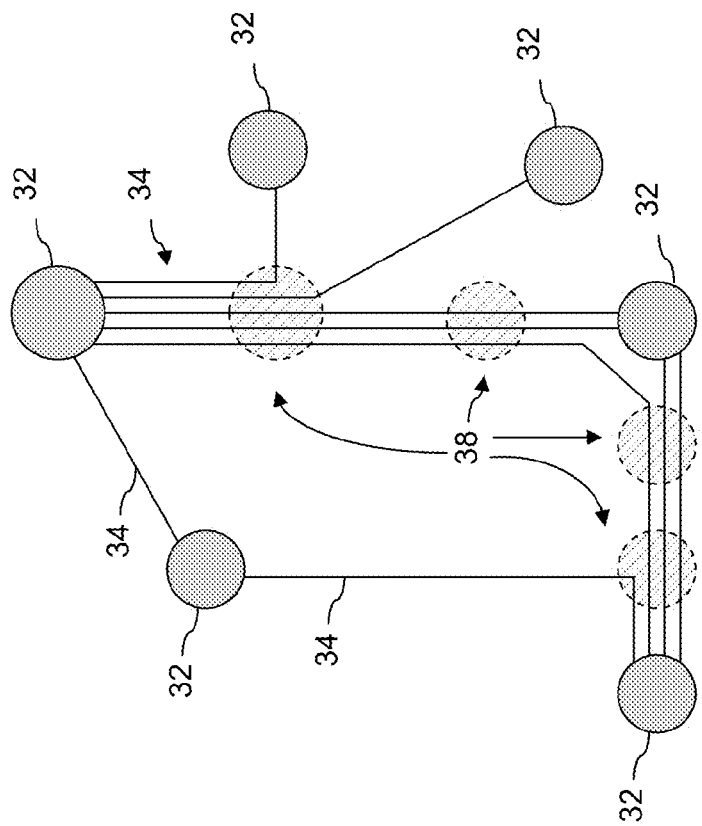
FIG. 6 is a second graph model of the transmission grid of FIG. 3 including non-terminating vertices to represent common vulnerabilities among transmission paths.

Referring again to the graph model of FIG. 6, logical transmission paths are accurately represented according to a common vulnerability. In one example, power cabling can extend through the same pipe between nodes in the physical network. The pipe is not a logical destination point, and therefore not normally depicted in the graph model topology. However, the system and method of the present invention include the pipe in the graph model topology because it represents a potential common vulnerability among multiple transmission paths. If in practice the pipe were sufficiently damaged, each of the power cables extending through the pipe would be damaged. This potential failure point is accounted for utilizing the system and method noted above.

Also by example, a non-terminating critical vertex can include a router in an internet communications network. In one aspect, the router serves as a gateway to a set of workstations. The router can therefore be modeled as a pass-through device for internet traffic, represented as a non-terminating node. In another aspect, the router is a terminating node for SNMP messages intended for server management. The router can therefore be modeled as a destination point for SNMP messages, represented as a terminating node. A multi-layer network model, separating various levels of the protocol stack, can incorporate a different logical graph for each protocol layer without having to split the model into multiple distinct graphs for storage and processing. The intermediate element is therefore depicted as a non-terminating vertex on a first protocol layer and depicted as a terminating vertex on a second protocol layer.

To reiterate, the system and method generally include generating a graph model including a non-terminating vertex to represent a non-nodal vulnerability in the physical network. The non-terminating vertex can be utilized to represent common vulnerabilities among multiple transmission paths within the physical network, and to determine overall network reliability and vulnerability. In addition, the correct definition of sub-graph can be more clearly shown from the model of FIG. 6. When an edge 34 is removed, and a vertex 32, 38 is orphaned, the vertex is removed from the graph, whether it is a terminating vertex or a non-terminating vertex. When a non-terminating vertex 38 is removed from the graph, all edges 34 passing through the vertex 38 are removed. This sequence reveals the correct behavior of the physical network, in that the non-terminating vertex 38 can represent a single point of failure, taking with it all of the edges that pass through it. The non-terminating vertex 38 can additionally represent a non-critical element in the physical network. For example, a non-weighted extended graph can include a set of vertices ($\{v_1, c_1\} \{v_2, c_2\} \ldots \{v_n, c_n\}$), where $c_i$ is a binary variable denoting whether the vertex is critical or non-critical for a given edge. Non-terminating, non-critical vertices can most accurately represent add-on capabilities whose failure does not impinge on the transmission capability of the network. Examples can include optical network taps, backup diesel generators, circuit breakers, weigh stations, and water reserve tanks, for example.

Figure 2:
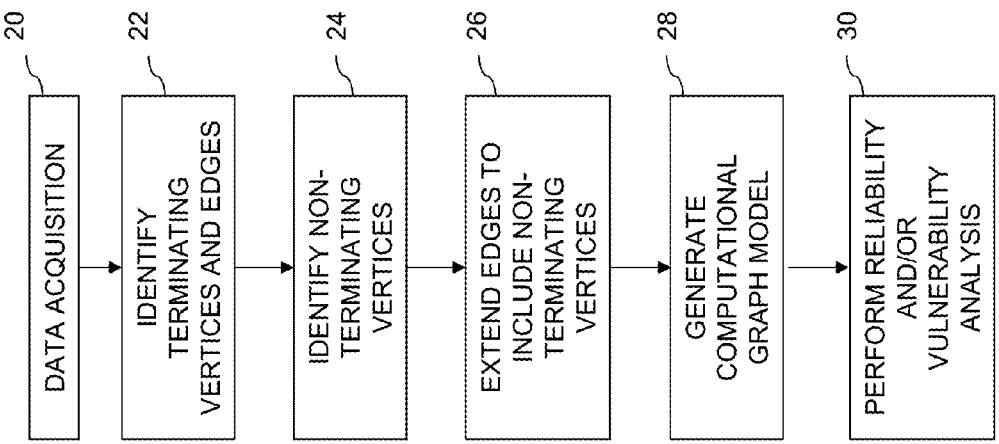
FIG. 2 is a flow diagram illustrating operation of the graph model system of FIG. 1.
Figure 3:
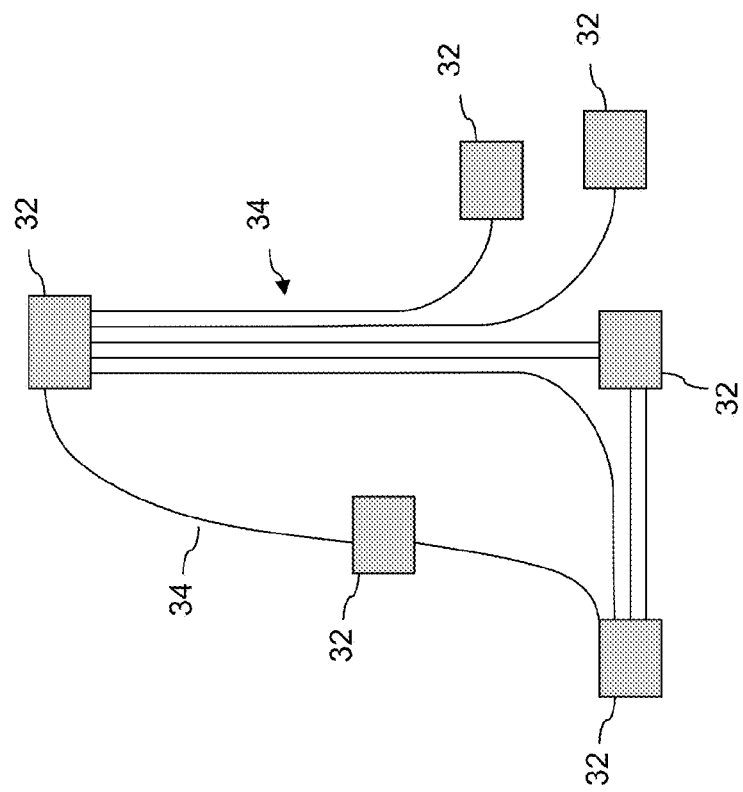
FIG. 3 is a transmission grid including substations and transmission paths.

As set forth above, embodiments of the present invention are utilized in connection with a computer apparatus 10, which utilizes a processor 12 to execute a series of commands representing one or more method steps schematically depicted in FIG. 2. The computer apparatus 10 is generally programmed with a series of instructions that, when executed, cause the processor 12 to perform method steps as described above. The instructions that are performed by the processor 12 are generally stored in a computer readable data storage device 14. The computer readable data storage device 14 can be a portable memory device that is readable by the computer apparatus 12. Such portable memory devices can include a compact disk, a digital video disk, a flash drive, and any other disk readable by a disk driver embedded or externally connected to a computer, a memory stick, or any other portable storage medium whether now known or hereinafter developed. Alternatively, the machine-readable data storage device can be an embedded component of a computer such as a hard disk or a flash drive of a computer. Together, the computer and machine-readable data storage device can be a standalone device or embedded into a machine or a system that uses the instructions for a useful result.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. An apparatus for modeling a physical network, comprising:
   a processor operable to execute preprogrammed instructions; and
   a memory operable to store computer programmed instructions executable by the processor for performing the steps of:
      constructing a model including:
         a plurality of terminating vertices representing network nodes, a plurality of edges interconnecting the plurality of vertices representing a plurality of transmission paths between the network nodes, and a non-terminating vertex on at least one of the plurality of edges representing a non-nodal vulnerability of the network, the non-nodal vulnerability being an intermediate element along at least one of the plurality of transmission paths; and
      performing a vulnerability analysis utilizing the constructed model.

2. The apparatus of claim 1 wherein the intermediate element is positioned along at least two of the plurality of transmission paths.

3. The apparatus of claim 2 wherein a degradation of the intermediate element in the network results in a degradation of the transmission paths traversing the intermediate element.

4. The apparatus of claim 2 wherein the intermediate element is a critical failure point.

5. The apparatus of claim 2 wherein the constructed model is a multi-layered model including a plurality of sub-graphs.

6. The apparatus of claim 5 wherein:
   the plurality of sub-graphs includes a first sub-graph and a second sub-graph; and
   the intermediate element is depicted as a non-terminating vertex on the first graph and depicted as a terminating vertex on the second sub-graph.

7. The apparatus of claim 1 wherein performing a vulnerability analysis includes determining whether the network should be modified to include one or more additional nodes or transmission paths.

8. The apparatus of claim 1 wherein the constructed model includes a weighted graph, wherein the edge extending through the non-terminating vertex includes a first weight on one side thereof and a second weight on another side thereof.

9. The apparatus of claim 1 wherein:
   the non-terminating vertex is a non-critical vertex along a transmission path; and
   an alteration of the transmission path in the network is represented by removal of the non-critical, non-terminating vertex in the constructed model.

10. The apparatus of claim 1 wherein the network includes one of a power grid infrastructure, a network topology, a fluid distribution system, a manufacturing system, and a logistical infrastructure.

11. A method for modeling the vulnerability and reliability of a physical network utilizing a computer with a series of preprogrammed instructions, the method comprising:
   constructing a graph model of the physical network using the computer, the model including:
      a plurality of terminating vertices representing nodes of the physical network, a plurality of edges interconnecting the plurality of terminating vertices representing transmission paths between the network nodes, and a non-terminating vertex representing an intermediate element along at least one of the transmission paths in the physical network, such that the non-terminating vertex is positioned on at least one of the plurality of edges in the graph model; and using the computer, evaluating the vulnerability and reliability of the constructed model, wherein the vulnerability and reliability evaluation includes a determination of whether each terminating and non-terminating vertex represents a critical point of failure.

12. The method according to claim 11 wherein the intermediate element is a device or a structure that is utilized by at least two of the transmission paths in the physical network.

13. The method according to claim 12 wherein a degradation of the intermediate element in the physical network alters a characteristic of the transmission paths traversing the intermediate element.

14. The method according to claim 11 wherein the constructed model includes a weighted graph, wherein the edge extending through the non-terminating vertex includes a first weight on one side thereof and a second weight on another side thereof.

15. The method according to claim 11 wherein the vulnerability and reliability evaluation includes a determination of whether the physical network should be modified to include one or more additional nodes or transmission paths.

16. The method according to claim 11 wherein the constructed model is a multi-layered model including a plurality of sub-graphs.

17. The method according to claim 16 wherein:

the plurality of sub-graphs includes a first sub-graph and a second sub-graph; and the intermediate element is depicted as a non-terminating vertex on the first sub-graph and depicted as a terminating vertex on the second sub-graph.

18. The method according to claim 11 wherein the non-terminating vertex is a critical failure point.

19. The method according to claim 11 wherein the non-terminating vertex is a non-critical failure point.

20. The method according to claim 11 wherein the physical network includes one of a power grid infrastructure, a network topology, a fluid distribution system, a manufacturing system, and a logistical system.

* * * * *